(12) United States Patent
Estrada

(10) Patent No.: US 8,272,258 B2
(45) Date of Patent: Sep. 25, 2012

(54) AERODYNAMIC TEST STAND WITH ADJUSTABLE SUPPORTS FOR A VEHICLE AND LENGTH ADJUSTABLE BAND UNITS ADJACENT THE SUPPORTS

(75) Inventor: Gustavo Estrada, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 492 days.

(21) Appl. No.: 12/448,490

(22) PCT Filed: Dec. 19, 2008

(86) PCT No.: PCT/EP2008/010872
§ 371 (c)(1),
(2), (4) Date: Jun. 22, 2009

(87) PCT Pub. No.: WO2009/115109
PCT Pub. Date: Sep. 24, 2009

(65) Prior Publication Data
US 2010/0326178 A1      Dec. 30, 2010

(30) Foreign Application Priority Data
Mar. 18, 2008   (DE) .......................... 10 2008 014 716

(51) Int. Cl.
*G01M 17/007* (2006.01)

(52) U.S. Cl. .................................. 73/116.01; 73/118.01
(58) Field of Classification Search ............... 73/116.01, 73/116.05, 116.06, 116.07, 116.08, 116.09, 73/117.01, 118.01, 669, 670
See application file for complete search history.

(56) References Cited

U.S. PATENT DOCUMENTS

2006/0237237 A1   10/2006   Kerschbaum et al.
2008/0202227 A1    8/2008   Ebeling et al.

FOREIGN PATENT DOCUMENTS

| DE | 195 27 742 | 1/1997 |
| DE | 103 38 638 | 3/2005 |
| DE | 10 2005 040 445 | 3/2007 |
| GB | 273742 | 11/1927 |
| JP | 06-341920 | 12/1994 |
| WO | WO 2007/141639 | 12/2007 |

*Primary Examiner* — Eric S McCall
(74) *Attorney, Agent, or Firm* — Gerald E. Hespos; Michael J. Porco

(57) ABSTRACT

An aerodynamic test stand (1) is provided for determining forces acting on a vehicle. The test stand has a stationary floor (2), at least two supporting devices (4) for supporting the motor vehicle, and at least one band unit moving in relation to the floor, for influencing air flow behavior in the floor region. The band unit is composed, segment-like, of runway sections (9, 10, 11, 20, 21, 22, 23, 24, 25, 26, 27, 28) to accurately detect forces acting on the vehicle.

4 Claims, 6 Drawing Sheets

AERODYNAMIC TEST STAND WITH ADJUSTABLE SUPPORTS FOR A VEHICLE AND LENGTH ADJUSTABLE BAND UNITS ADJACENT THE SUPPORTS

BACKGROUND OF THE INVENTION

1. Field of the Invention

The invention relates to an aerodynamic test stand.

2. Description of the Related Art

Aerodynamic test stands serve for determining aerodynamic properties, particularly in vehicles. As a rule, a wind tunnel is provided, which by means of a blower generates an airflow which is routed via straighteners to the aerodynamic test stand uniformly, in parallel and with low turbulence and noise.

It is known that, for the near-reality simulation of a road journey, it is advantageous to illustrate a moved roadway and wheel rotation, since the boundary layer flow on the ground and the flow around or through the moved wheel influence the forces acting on the vehicle. For this purpose, it has become known to arrange between the wheel rotation units, on which the vehicle is set down, a continuous runway which revolves at an appropriate speed.

DE 10 2005 040 445 A1 and DE 103 38 638 A1, furthermore, disclose a moved runway which simulates the roadway and which not only extends between the wheel rotation units, but beyond these. The vehicle is held laterally by means of fixing devices. The wheels of the vehicle are set down on standing surfaces which are located directly below the runway. The test stand shown in DE 103 638 A1 comprises a stationary floor on which the runway is mounted as an entire unit on a weighbridge. The forces in the vehicle longitudinal direction and vehicle transverse direction are measured at the bearings of the weighbridge, while the forces in the Z-direction are measured through the runway at the standing surfaces of the vehicle. It is advantageous that a road journey can be simulated optimally by means of the large-area runway. In this arrangement, however, the measurement data are influenced by aerodynamic interaction with the runway and have to be balanced accordingly.

The object of the invention is to provide an aerodynamic test stand which as accurately as possible detects the forces acting on the vehicle.

SUMMARY OF THE INVENTION

There is provision, according to the invention, for the aerodynamic test stand to comprise a stationary floor and at least two supporting devices for the support of the vehicle. To simulate a road journey, at least one band unit moving in relation to the floor is provided. This band unit is composed, segment-like, of runway sections. The crux of the invention, therefore, is not to provide a single large-area runway, but, instead, a plurality of smaller adjustable runway sections which together produce a band unit. The supporting devices are therefore arranged between the runway sections. Consequently, the forces which act on the supporting devices due to the vehicle can be introduced directly to an underfloor weighing appliance. In this case, the forces both in the X- and Y-direction and in the Z-direction can be measured directly. It is in this case advantageous if the active force pick-up surfaces within the band unit are kept as small as possible, so that, in actual fact, only those forces are measured which the vehicle exerts on the supporting devices. Flow forces which act on the runway sections are not detected. The flow topology across the runway sections therefore has no influence on the measurement results. Owing to the segment-like division and the adjustability of the runway sections, a variable band unit can be implemented, which can be used for the most diverse possible vehicle types.

In order to obtain as large a coherent runway surface as possible, runway sections may be arranged in each case in front of, behind or between the supporting devices. The more closely the individual runway sections lie together, the more positively the boundary layer flow can be influenced.

There may be provision for at least one of the supporting devices to be held so as to be relatively movable with respect to the other supporting device. Consequently, the distance between the two supporting devices can be selected freely, so that a modular assembly of the test stand is possible. In a preferred refinement of the invention, overall, four supporting devices are provided, in order to make a supporting device available for each wheel in four-wheel motor vehicles. The supporting units are anchored on an underfloor weighing appliance as a function of the wheel base or track of the motor vehicle. It is conceivable that even two-wheel or three-wheel vehicles can be investigated by means of the aerodynamic test stand, since the supporting devices can be converted correspondingly.

The dimensions of the runway section extending between two supporting devices can be set according to the distance between the two supporting devices. It is in this case advantageous if the runway sections can be lengthened or shortened correspondingly.

In order also to simulate the flow through or around the wheel, the vehicle does not stand, unmoved, on the supporting device, but rotatably. For this purpose, the supporting device may be designed as a wheel rotation device.

Preferably, the wheel rotation device may be formed by a belt band rotating about a pair of rollers.

The runway sections may comprise a runway belt rotating about carrying rollers, an additional deflection unit being provided. The deflection unit has the effect that the runway belt rotates about the carrying rollers with a sufficient frictional connection.

For maximum flexibility, the distance between two carrying rollers may be adjustable. In the case of the offset of the supporting device, the length of the runway can be adapted by increasing or reducing the distance between the two carrying rollers. To ensure frictional connection, the position of the additional deflection unit may likewise be variable, in order to keep the runway belt under pretension.

Further advantageous embodiments of the invention are explained in more detail below with reference to the drawings.

DETAILED DESCRIPTION OF THE PREFERRED EMBODIMENTS

Figure 1:
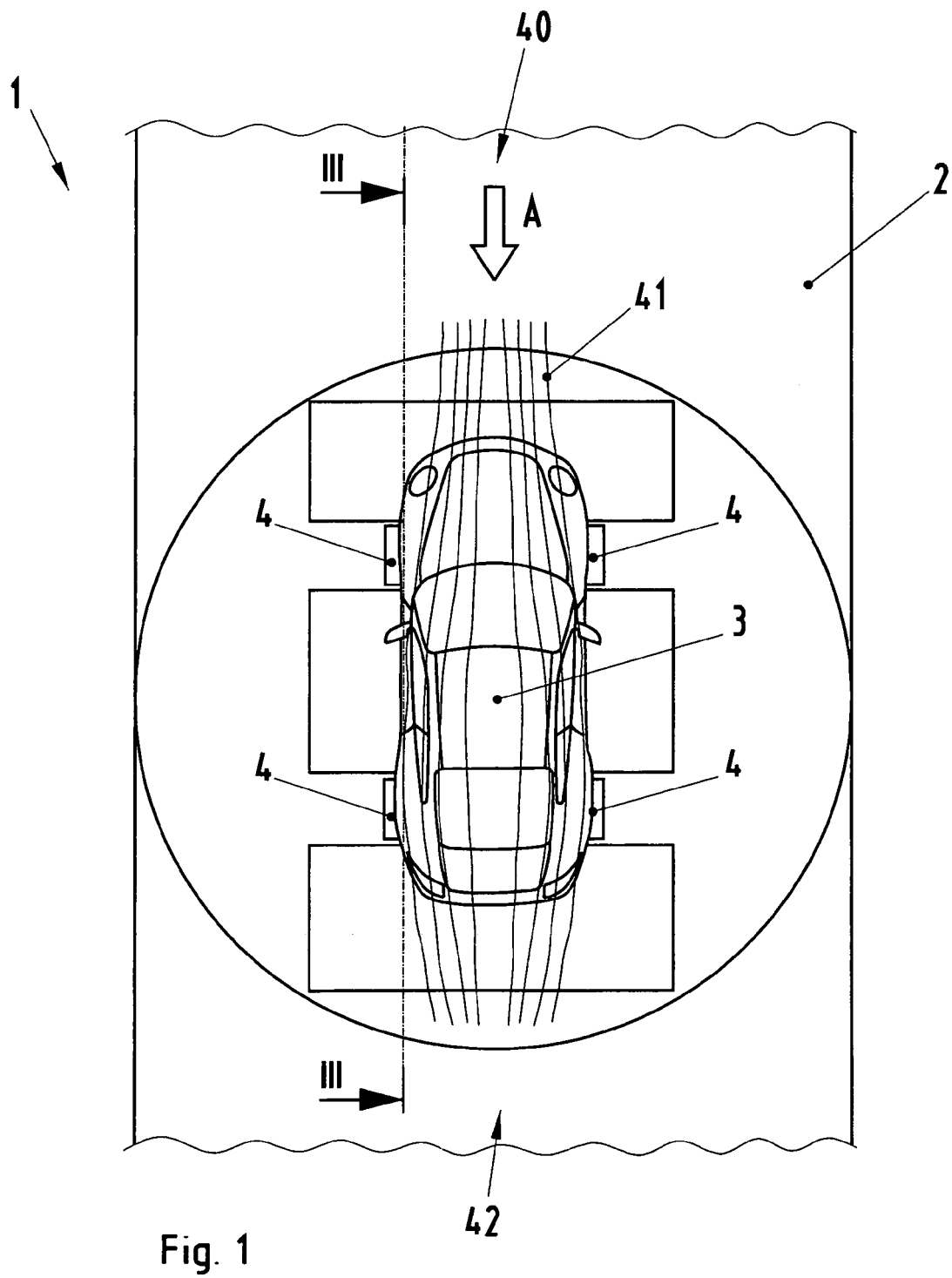
FIG. 1 shows a view of an aerodynamic test stand from above.
Figure 2:
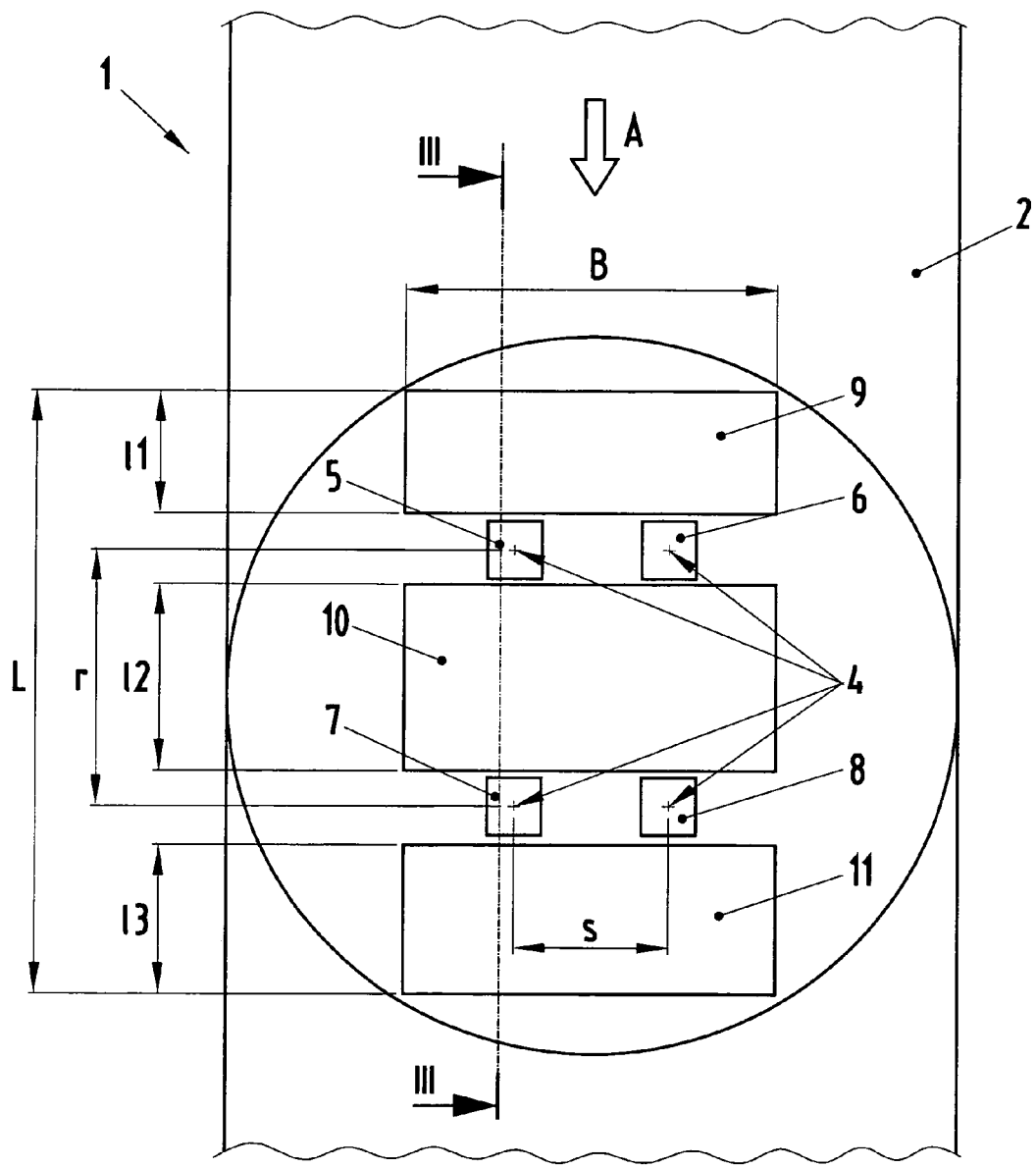
FIG. 2 shows a view according to FIG. 1 without a vehicle.
Figure 3:
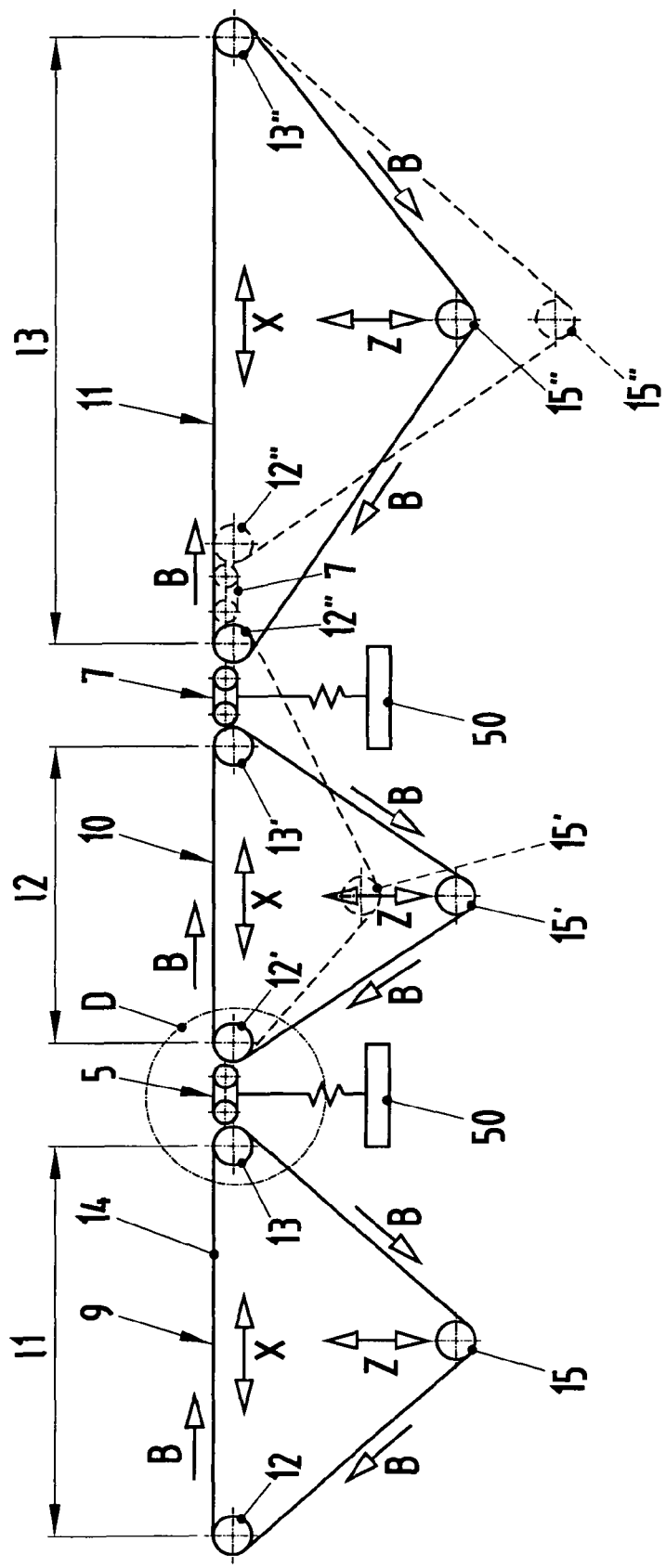
FIG. 3 shows a sectional illustration along the line III-III in FIG. 1.

The views from above according to FIGS. 1 and 2 and also the side view according to FIG. 3 show a first preferred embodiment of an aerodynamic test stand 1. In the wind tunnel, not illustrated in any more detail, an airflow A is generated by means of a nozzle 40 and is routed via straighteners to the aerodynamic test stand 1 uniformly, in parallel and with low turbulence and noise. The flow profile is illustrated by flow lines 41. Behind the test stand 1, the airflow A is conveyed to the nozzle 40 again by means of a collector 42. The aerodynamic test stand 1 is delimited downward by a stationary floor 2. A vehicle 3 can be set down on supporting devices 4 which are designed as wheel rotation devices 5, 6, 7 and 8. The wheel rotation devices 5, 6, 7 and 8 are preferably designed as a drive unit, so that the wheels of the vehicle can be driven. Alternatively, it is also conceivable that the wheel rotation devices are suitable for decreasing the power of an engine-powered vehicle 3.

The two wheel rotation devices 5 and 6 or 7 and 8 lying next to one another are spaced apart from one another according to the track s, while the wheel rotation devices 5 and 7 or 6 and 8 lying one behind the other are spaced apart from one another according to the wheel base r of the vehicle 3.

Arranged in front of the two front wheel rotation devices 5 and 6 is a first runway section 9 which has a width B and an adjustable length 11. The width B is greater than the track s, so that the runway section 9 extends laterally beyond the two wheel rotation devices 5 and 6.

Behind the two front wheel rotation devices 5 and 6 is arranged a second runway section 10 which covers the distance between the front and rear wheel rotation devices. The second runway section 10 has the same width B as the first runway section 9, and the likewise adjustable length 12 is to be selected as a function of the wheel base r and in this exemplary embodiment is lower than the length 11.

A third runway section 11 is provided behind the wheel rotation devices 7 and 8. Its length 13, too, is adjustable. The length 13 can be kept longer, precisely in the rear region of the vehicle 3, than that of the two front runway sections as a function of the interfacial flow to be achieved. The width B of the third runway section corresponds to the width of the front runway sections 9 and 10.

The band unit influencing the flow behavior in the floor region is therefore formed from three runway sections 9, 10 and 11, the band unit being interrupted in its longitudinal extent L by the wheel rotation devices 5 to 8.

The wheel rotation devices 5 to 8 may be mounted together on a common underfloor weighing appliance 50. By means of the underfloor weighing appliance 50, the forces acting in the X-, Y- and Z-directions can be picked up. Alternatively or additionally, force pick-ups under each wheel rotation device are possible, in order to detect the individual forces acting in each case. The detection of acting moments, such as a pitching, yawing and tilting moment, is consequently likewise possible.

The side view, illustrated in FIG. 3, along the line III-III in FIG. 1 shows the arrangement of the runways 9, 10 and 11.

The runway section 9 is equipped with two carrying rollers 12 and 13, about which a runway belt 14 rotates clockwise according to the direction of the arrow B. In addition, a deflection unit 15 is provided within the circumference enclosed by the runway belt 14. The carrying rollers 12 and 13 can be displaced towards one another or away from one another according to the direction of the arrow X. Displacement may take place via spindle drives, rack drive or hydraulic/pneumatic drives. In order to ensure a sufficient frictional connection for the uniform rotation of the runway belt 14, the position of the additional deflection unit 15 is variable. For this purpose, it can be held displaceably in vertical and/or horizontal guides. Thus, for example, the belt slack can be taken out of the runway belt 14 by the deflection unit being displaced according to the direction of the arrow Z. However, a displacement of the deflection unit 15 in the Z- and X-direction is also possible. The length 11 of the runway section 9 is thus variably adjustable.

The length 12 or 13 of the runway sections 10 and 11 can be adjusted in exactly the same way as the runway section 9. For the sake of clarity, the same components are designated by the same reference numerals, but with an apostrophe. Thus, the runway section 10 is equipped with two carrying rollers 12' and 13', a runway belt 14' and a deflection unit 15'. Similarly, the runway section 11 is equipped with 2 carrying rollers 12" and 13" and a deflection unit 15".

Figure 6:
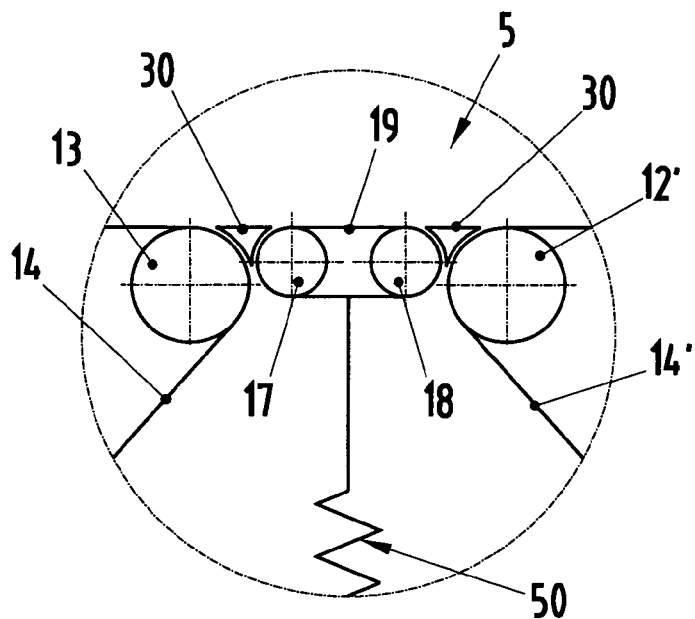
FIG. 6 shows an illustration of the wheel rotation unit according to FIG. 3 in the form of a detail.

The wheel rotation devices 5 and 7 are formed by a belt band 19 rotating about two rollers 17 and 18. The illustration D of the wheel rotation device 5 in FIG. 3 in the form of a detail is illustrated, enlarged, in FIG. 6. Wedges 30 are inserted on both sides next to the pair of rollers 16, so that the wheel rotation device 5 and the adjacent runway sections 9 and 10 adjoin one another with flush surfaces.

Figure 7:
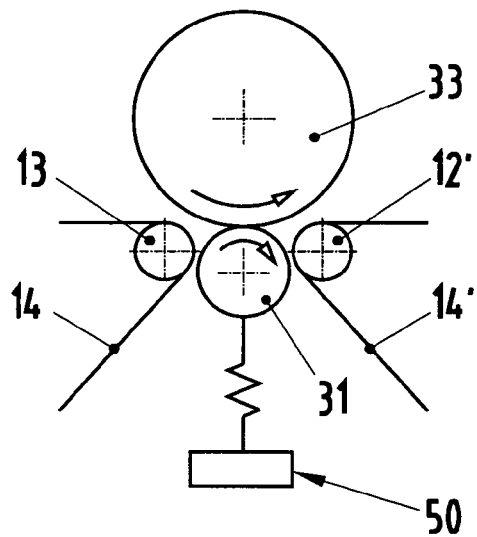
FIG. 7 shows a second embodiment of a wheel rotation unit.

According to FIG. 7, an alternative embodiment of the wheel rotation device 5 may be one where only a single roller 31 is arranged between the two runway sections 9 and 10. Reference numeral 33 denotes the motor vehicle wheel set down on the wheel rotation device 5.

Figure 8:
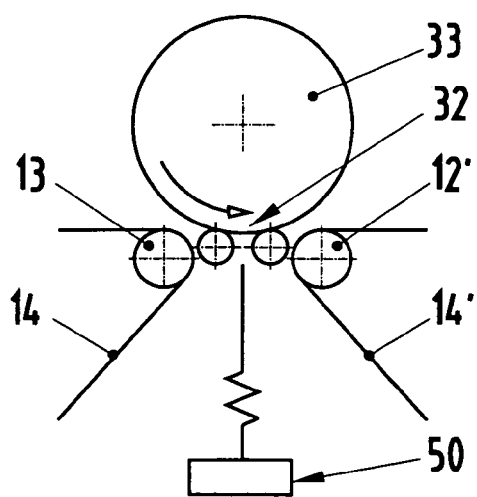
FIG. 8 shows a third embodiment of a wheel rotation unit.

A third embodiment of the wheel rotation device 5 becomes possible, according to FIG. 8, by means of a pair of rollers 32 without a rotating belt band.

Each of the wheel rotation devices 5 and 7 can be positioned according to the wheel base r or the track s of the motor vehicle to be tested. If, for example, a larger wheel base than is shown in FIG. 3 should be required, the wheel rotation device 7 can be displaced to the right into the position indicated by dashes. The rear carrying roller 13' of the runway 10 is likewise displaced to the right, while the deflection unit 15' is displaced vertically upward into the position indicated by dashes. The length 12 of the runway 10 is consequently lengthened.

The length 13 of the runway section 11 is shortened in a similar way. For this purpose, the front carrying roller 12" is displaced to the right, while the deflection unit 15" has to be displaced downward, in order to tension the runway section 11.

The orientation of the vehicle and consequently the positioning of the wheel rotation devices 5, 6, 7 and 8 may take place at the center of the aerodynamic test stand. That is to say, the vehicle center is positioned at the center of the aerodynamic test stand. Alternatively, an orientation of the vehicle via a constant distance between the vehicle nose and the nozzle is possible. The advantage of this is that the onflow forces are constant in this position. Theoretically, the displaceability of the front supporting devices 5 and 6 could then be dispensed with.

The great variance in the possibilities for arrangement affords the advantage that virtually any desired vehicle can be tested in the aerodynamic test stand and yet a coherent band unit is preserved. It is even conceivable to push the wheel rotation units 5 and/or 6 and 7 and/or 8 lying next to one another into the center, so that the flow can be applied to two-wheel vehicles such as, for example, motor cycles or bicycles, with the band unit running. Alternatively, in this application, one of the front and one of the rear wheel rotation units could be dispensed with, and the two remaining wheel rotation units could be oriented in alignment with one another in a longitudinal direction. It goes without saying that, in this arrangement, it is even possible for the flow to be applied to three-wheel vehicles, with the band unit running.

Figure 4:
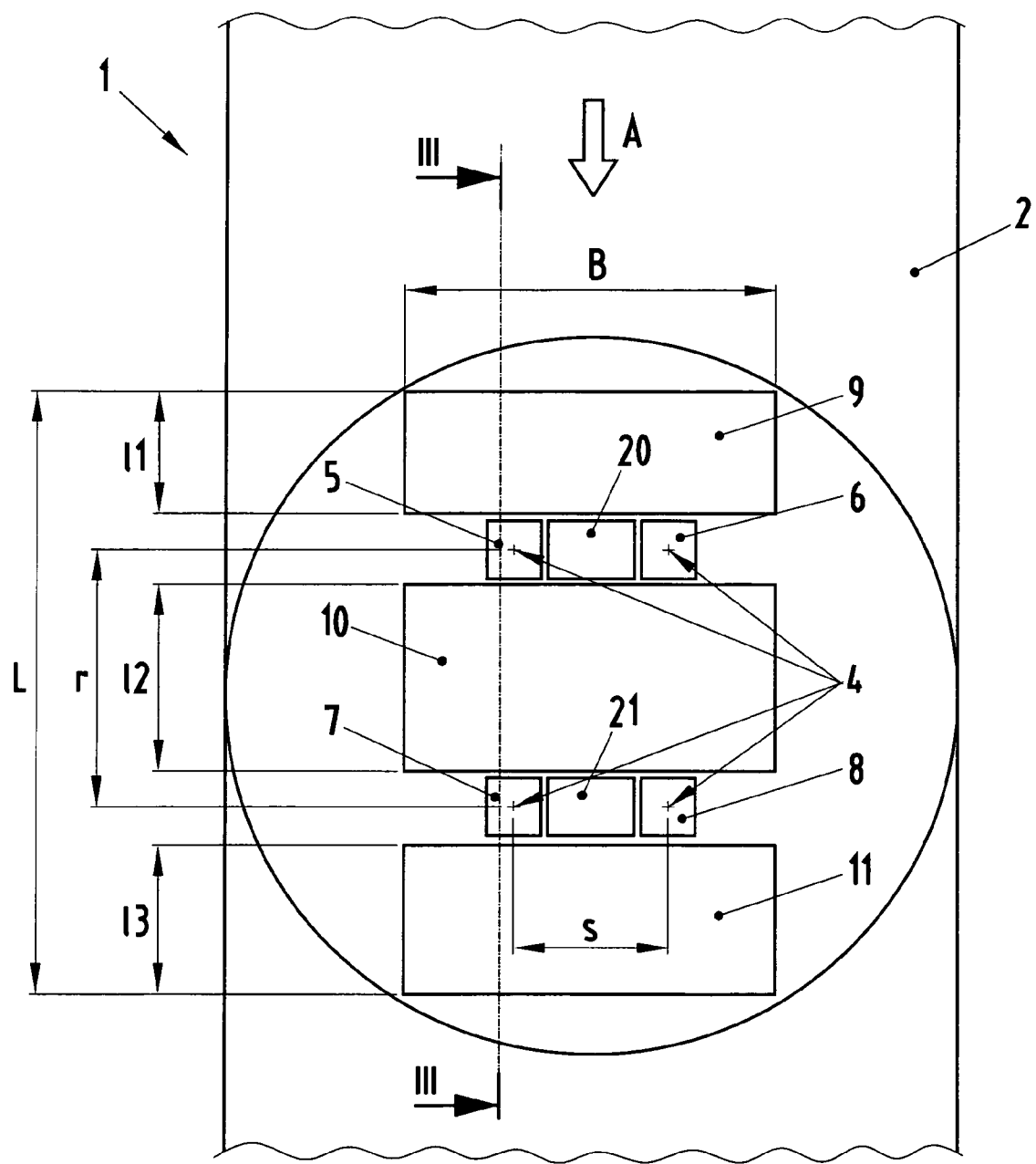
FIG. 4 shows a second embodiment of the aerodynamic test stand.

In addition to the variant, shown in FIGS. 1 to 3, with three runway sections, there may alternatively be provision, as shown in FIG. 4, for a further runway section 20 and 21 to be provided between the wheel rotation units 5 and 6 or 7 and 8. With the track s being increased, this runway section 20 or 21 would have to be such that it could be exchanged for a wider runway section, in order to form a corresponding width. Further runway sections could also be provided in addition to the wheel rotation devices 5, 6, 7 or 8.

Figure 5:
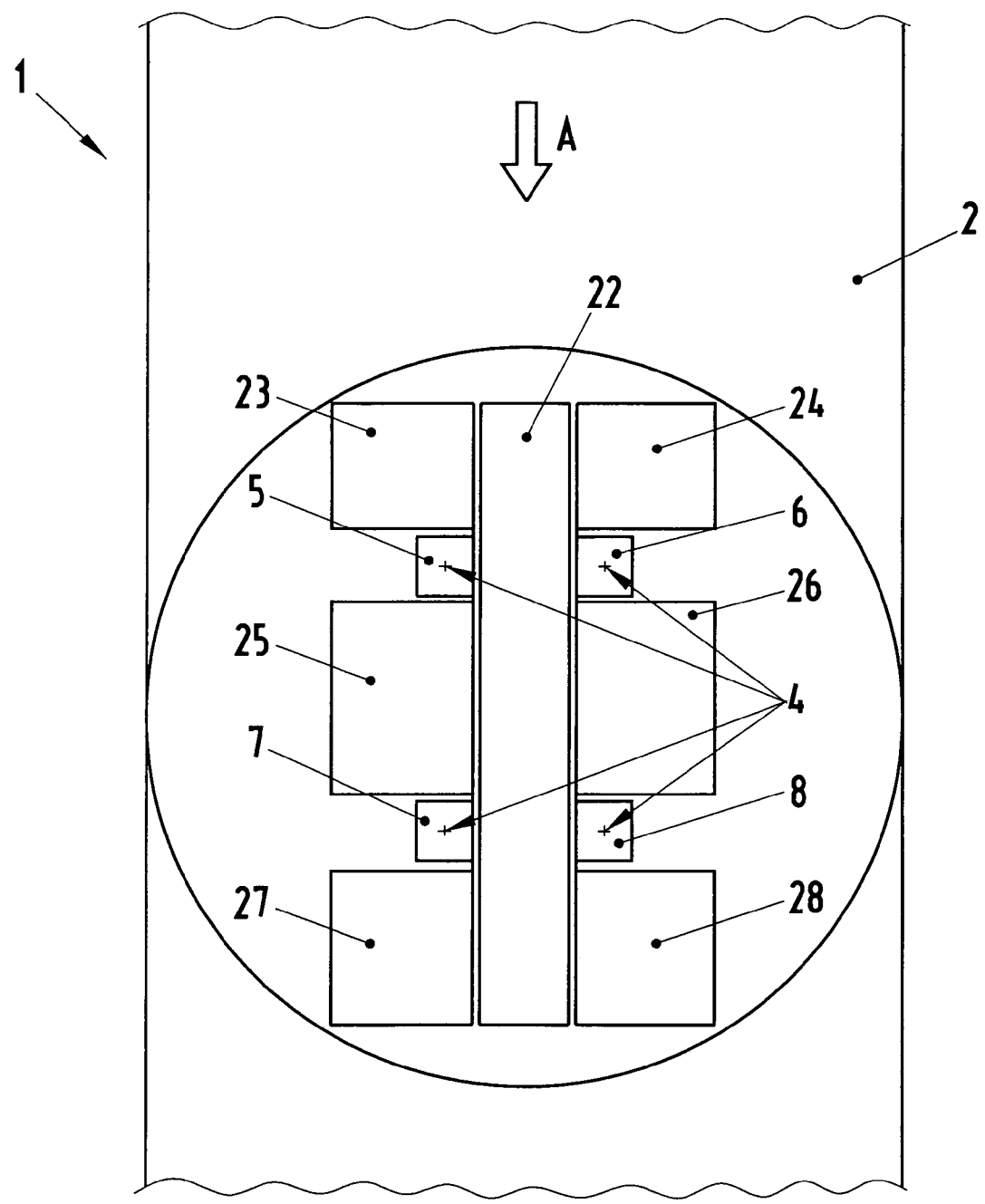
FIG. 5 shows a third embodiment of the aerodynamic test stand.

A third embodiment of the invention is shown in FIG. 5 in which a middle runway 22 is arranged between the wheel rotation units 5, 6 and 7, 8. Further runway sections 23 and 24 are then provided in front of the wheel rotation units 5 and 6 in each case on the right and on the left of the middle runway 22. The band unit is virtually assembled by means of the further runway sections 25, 26, 27 and 28.

A version, not illustrated, could be one in which a runway of equal length is arranged in each case on the outside of the wheel rotation units with respect to the middle runway section 22, so that three runway sections of equal length are provided. The free sections between the front wheel rotation device 5 or 6 and the rear wheel rotation device 7 or 8 may be closed in each case by means of a runway section.

From the exemplary embodiments explained above, it becomes clear that virtually any desired arrangement of runway sections is possible by means of the solution according to the invention. A band unit assembled in a modular way can thereby be produced.

The invention claimed is:

1. An aerodynamic test stand for determining forces acting on a vehicle, the test stand being supported on a stationary floor and comprising:
   at least one front wheel support for supporting at least one front wheel of the vehicle;
   at least one rear wheel support spaced from the front wheel support for supporting at least one rear wheel of the vehicle, the front and rear wheel supports being disposed in a plane, at least one of the front and rear wheel supports being movable toward and away from the other of the front and rear wheel supports for adjusting a distance between the front and rear wheel supports in accordance with a wheel base length of the vehicle;
   band units disposed respectively between the front and rear wheel supports, forward of the front wheel support and rearward of the rear wheel support, each of the band units having a runway belt rotatable about at least two carrying rollers disposed substantially in the plane of the front and rear wheel supports, the carrying rollers of each of the band units being selectively movable toward and away from one another, each of the band units further including a deflection unit offset from the plane of the front and rear wheel supports and being selectively movable toward and away from the plane of the front and rear wheel supports in accordance with movements of the carrying rollers of the respective band unit.

2. The test stand of claim 1, wherein the deflection unit of each of the band units is movable toward the plane of the front and rear wheel supports when the respective carrying rollers move away from one another and is movable away from the plane of the front and rear wheel supports when the respective carrying rollers move toward one another so that lengths of the respective band units in the plane of the wheels supports are adjustable while maintaining a selected pretension on the respective runway belt.

3. The test stand of claim 1, wherein the front and rear wheel supports are wheel rotation devices.

4. The test stand of claim 3, wherein at least one of the wheel rotation devices is a belt band rotating about rollers.

* * * * *